(12) United States Patent (10) Patent No.: US 12,679,182 B2
Sasaki (45) Date of Patent: Jul. 14, 2026

(54) DOOR HOLE COVER

(71) Applicant: NISHIKAWA RUBBER CO., LTD.,
Hiroshima (JP)

(72) Inventor: Naoya Sasaki, Hiroshima (JP)

(73) Assignee: NISHIKAWA RUBBER CO., LTD.,
Hiroshima (JP)

( * ) Notice: Subject to any disclaimer, the term of this
patent is extended or adjusted under 35
U.S.C. 154(b) by 223 days.

(21) Appl. No.: 18/788,393

(22) Filed: Jul. 30, 2024

(65) Prior Publication Data

US 2025/0074165 A1 Mar. 6, 2025

(30) Foreign Application Priority Data

Aug. 30, 2023 (JP) ................................. 2023-140322

(51) Int. Cl.
*B60J 5/04* (2006.01)
(52) U.S. Cl.
CPC ........... *B60J 5/0416* (2013.01); *B60J 5/0413*
(2013.01)
(58) Field of Classification Search
CPC .............................. B60J 5/0416; B60J 5/0413
See application file for complete search history.

(56) References Cited

U.S. PATENT DOCUMENTS 5,531,499 A * 7/1996 Vecchio .............. B60R 21/0428
24/297
6,196,607 B1 * 3/2001 Gulisano ................. B60R 13/01
296/146.7

D456,699 S * 5/2002 Nakanishi ...................... D8/382
6,390,533 B1 * 5/2002 Furuse ................... B60J 5/0468
296/146.5
6,983,978 B2 * 1/2006 Radu ................... B60R 13/0243
296/146.7
7,017,239 B2 * 3/2006 Kurily ................... F16B 21/086
24/453
7,178,855 B2 * 2/2007 Catron ................... B60J 5/0468
24/297
7,198,315 B2 * 4/2007 Cass ................... B29C 45/1635
24/297
12,269,325 B2 * 4/2025 Thienel ................... F16B 21/07
(Continued)

FOREIGN PATENT DOCUMENTS

JP 61-150509 9/1986
JP 04-084905 7/1992
(Continued)

*Primary Examiner* — Faye M Fleming
(74) *Attorney, Agent, or Firm* — Casimir Jones, S.C.;
Robert A. Goetz

(57) ABSTRACT

This invention improves work efficiency of a detachment
work of detaching a door hole cover from a door inner panel.
The door hole cover is to be attached to a door inner panel
of a vehicle's door, the door hole cover including: recessed
portions each allowing a clip to be housed therein, the clip
being used to attach the door hole cover to the door inner
panel; a pair of guide walls connected to an end portion of
each recessed portion which end portion has an opening, the
guide walls facing each other, the guide walls guiding the
clip to an inside of the recessed portion; and a protruded
portion protruding from one of the guide walls, at least part
of a first one of the guide walls protruding, more than a
second one of the guide walls, in a direction for narrowing
a space between the guide walls.

4 Claims, 3 Drawing Sheets

(56) References Cited

U.S. PATENT DOCUMENTS

| 12,583,298 B2* | 3/2026 | Hirano | B60J 10/75 |
| 2007/0119102 A1* | 5/2007 | Seibert | B60J 5/0416 |
| | | | 49/502 |
| 2023/0034614 A1 | 2/2023 | Okino et al. | |

FOREIGN PATENT DOCUMENTS

| JP | 05-030522 | 4/1993 |
| JP | 06-080004 | 11/1994 |
| JP | 11-189104 | 7/1999 |
| JP | 2000-081013 | 3/2000 |
| JP | 2016-78775 | 5/2016 |
| JP | 2023-019065 | 2/2023 |

* cited by examiner

DOOR HOLE COVER

This Nonprovisional application claims priority under 35 U.S.C. § 119 on Patent Application No. 2023-140322 filed in Japan on Aug. 30, 2023, the entire contents of which are hereby incorporated by reference.

TECHNICAL FIELD

The present invention relates to a door hole cover.

BACKGROUND ART

Heretofore, a door hole cover has been used to cover a service hole provided in a door inner panel of a door of a vehicle. The door hole cover is attached to the door inner panel by a clip from a vehicle interior side.

For example, Patent Literature 1 discloses a door structure in which a door hole cover for covering a service hole provided in a door inner panel is attached to the door inner panel. The door hole cover is attached to the door inner panel by fitting a clip to an attachment hole of the door hole cover.

Patent Literature 2 discloses a clip mounting pedestal which facilitates attachment of a clip to an interior component for automobiles. A clip is inserted through an introduction groove of the clip mounting pedestal, and then is fitted to a circular hole of the clip mounting pedestal. The clip mounting pedestal has retaining projections provided at two opposite sides of the introduction groove. The retaining projections and a flange portion of the clip are configured to come into contact with each other, thereby preventing the clip from falling off from the circular hole. A width of the introduction groove is set so as to be wider than a width of a clip shaft. Further, the clip is formed such that the flange portion of the clip is bent so as to allow the clip to climb over the retaining projections when the clip is inserted into the introduction groove.

CITATION LIST

Patent Literature

[Patent Literature 1]
Japanese Patent Application Publication, Tokukai, No. 2016-78775
[Patent Literature 2]
Japanese Unexamined Utility Model Application Publication, Jitsukaisho, No. S61-150509 (1986)

SUMMARY OF INVENTION

Technical Problem

Incidentally, it is considered that application of the technique of Patent Literature 2 to the technique of Patent Literature 1 can improve work efficiency of an attachment work of attaching the door hole cover to the door inner panel.

However, in a detachment work of detaching the door hole cover from the door inner panel, a tool used for the detachment work and the retaining projections, provided at the two opposite sides of the introduction groove, with interfere each other. Consequently, the tool cannot be inserted between the door inner panel and the door hole cover. Thus, there is a possibility that the detachment work may be made difficult.

An aspect of the present invention has an object to improve the work efficiency of the detachment work of detaching the door hole cover from the door inner panel.

Solution to Problem

In order to attain the above object, a door hole cover in accordance with a first aspect of the present invention is a door hole cover which is to be attached to a door inner panel of a door of a vehicle, the door hole cover including: a cover member configured to cover, from a vehicle interior side, a door hole provided in the door inner panel; a plurality of recessed portions provided in a periphery of the cover member, each of the plurality of recessed portions being configured to allow a clip to be housed therein, the clip being used to attach the door hole cover to the door inner panel; a pair of guide walls connected to an end portion of a corresponding one of the plurality of recessed portions which end portion has an opening, the pair of the guide walls facing each other, the pair of the guide walls being configured to guide the clip to an inside of the corresponding one of the plurality of recessed portions; and a protruded portion protruding from one of the pair of the guide walls, the pair of the guide walls creating a space therebetween, the pair of the guide walls being constituted by a first guide wall and a second guide wall, at least part of the first guide wall protruding, more than the second guide wall, in a direction for narrowing the space, the at least part of the first guide wall coming into contact with the clip so that the clip housed in the corresponding one of the plurality of recessed portions is restricted from moving toward the space, and the protruded portion coming into contact with the clip so that the clip housed in the corresponding one of the plurality of recessed portions is restricted from moving through the space toward an outside of the space.

Advantageous Effects of Invention

In accordance with an aspect of the present invention, it is possible to improve the work efficiency of the detachment work of detaching the door hole cover from the door inner panel.

DESCRIPTION OF EMBODIMENTS

[Overview of Door Hole Cover and Example of Attachment of Door Hole Cover]

Figure 1:
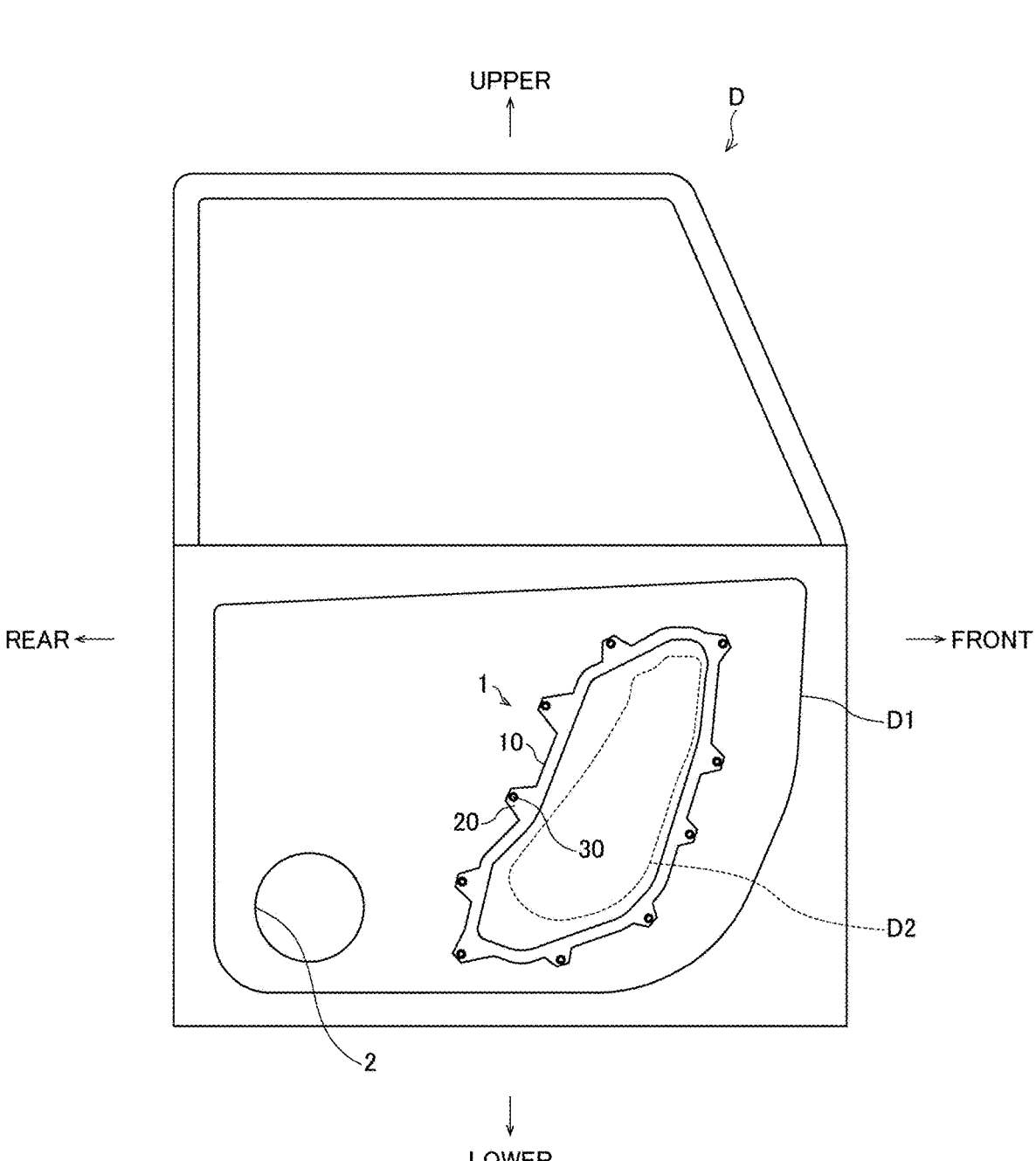
FIG. 1 is a view schematically illustrating a structure of a door inner panel to which a door hole cover in accordance with an embodiment is attached, viewed from a vehicle interior side.
Figure 2:
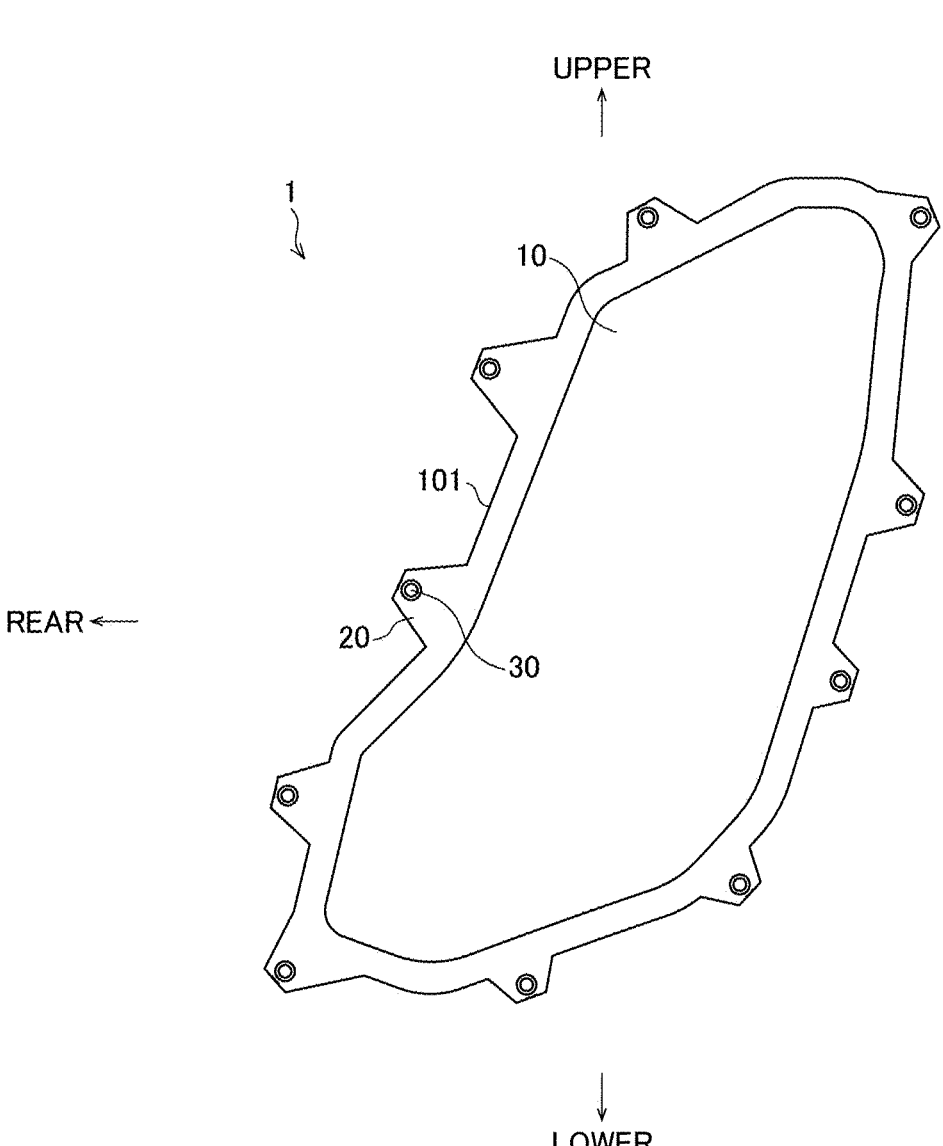
FIG. 2 is a side view of the door hole cover shown in FIG. 1, viewed from the vehicle interior side.

The following will describe, with reference to FIGS. 1 and 2, an overview of a door hole cover 1 in accordance with an embodiment of the present invention and an example of attachment of the door hole cover 1. FIG. 1 is a view schematically illustrating a structure of a door inner panel D1 to which the door hole cover 1 is attached, viewed from a vehicle interior side. FIG. 2 is a side view of the door hole cover 1 shown in FIG. 1, viewed from the vehicle interior side. In the example shown in FIG. 1, an upper side, a lower side, a right side, a left side, a front side, and a back side of a drawing sheet of FIG. 1 respectively correspond to a vertically upper side, a vertically lower side, a front side (a front side of the vehicle), a rear side (a rear side of the vehicle), a vehicle interior side (an inner side of the vehicle), and a vehicle exterior side (an outer side of the vehicle). This applies also to FIG. 2. FIG. 1 is a view of a front door D viewed from the vehicle interior side. This, however, does not limit a direction of attaching the door hole cover 1 to the vehicle. The door hole cover 1 may be attached to the vehicle in any direction.

The front door D is an example of the door of the vehicle. The front door D is attached to a front door opening (not illustrated) of the vehicle in such a manner as to allow the front door D to open and close. The front door D includes a door outer panel (not illustrated) and a door inner panel D1. The door inner panel D1 has a door hole D2 and a speaker attachment hole 2. The door hole D2 is an opening through which a work person can put his/her hand(s), a work tool, or the like to mount various parts in the front door D, for example. The speaker attachment hole 2 is an opening to which a speaker is attached. Note that the manner, shown in FIG. 1, in which the front door D is structured is merely an example.

The door hole cover 1 is attached to a surface of the door inner panel D1 which surface is on the vehicle interior side. By covering the door hole D2 from the vehicle interior side, the door hole cover 1 prevents rainwater and/or the like having entered the inside of the front door D from intruding into a cabin of the vehicle through the door hole D2. Further, by covering the door hole D2, the door hole cover 1 improves soundproof performance of the front door D.

As shown in FIGS. 1 and 2, the door hole cover 1 includes a cover member 10 and clip pedestals 20. The cover member 10 is a member that covers, as a part of the door hole cover 1, the door hole D2 from the vehicle interior side. As shown in FIG. 2, the plurality of clip pedestals 20 are provided in a periphery 101 of the cover member 10. Clips 30 are fitted to through-holes (not illustrated) in the door inner panel D1. The clip pedestals 20 of the door hole cover 1 are attached to the clips 30 fitted to the door inner panel D1. By attaching the clips 30 to the clip pedestals 20, the door hole cover 1 is attached to the door inner panel D1. Note that, in each of FIGS. 1 and 2, only one of the plurality of clip pedestals 20 and only one of the plurality of clips 30 are given a reference sign, and the others of the plurality of clip pedestals 20 and the others of the plurality of clips 30 are not given a reference sign, for the sake of ease of viewing the drawings.

The cover member 10 is made of, for example, a vulcanized rubber, a thermoplastic elastomer, a thermoplastic resin, a composite, or a metal. Examples of the vulcanized rubber may include ethylene-propylene-diene rubber (EPDM), isoprene rubber (IR), chloroprene rubber (CR), styrene-butadiene rubber (SBR), and acrylonitrile-butadiene rubber (NBR). Examples of the thermoplastic elastomer may include a thermoplastic olefinic elastomer (TPO) and a thermoplastic styrenic elastomer (TPS). Examples of the thermoplastic resin may include polyethylene (PE), polypropylene (PP), polyvinyl alcohol (PVA), polyvinylchloride (PVC), polystyrene (PS), acrylonitrile-butadiene-styrene (ABS), and ethylene-vinyl acetate (EVA). Examples of the composite may include a fiber aggregate such as a glass fiber blend. Examples of the metal may include aluminum and iron.

Note that an aspect, shown in FIG. 1, in which the door hole cover 1 is attached is merely one example. The vehicle's door to which the door hole cover 1 is attached is not limited to the front door D in the example shown in FIG. 1. Alternatively, the vehicle's door to which the door hole cover 1 is attached may be any kind of door, as long as it is a door of the vehicle. For example, the door hole cover 1 may be attached to a rear door or a sliding door. The vehicle to which the door hole cover 1 is attached may also be any kind of vehicle, examples of which include a hardtop vehicle and a convertible vehicle.

[Structure of Clip Pedestal 20]

Figure 3:
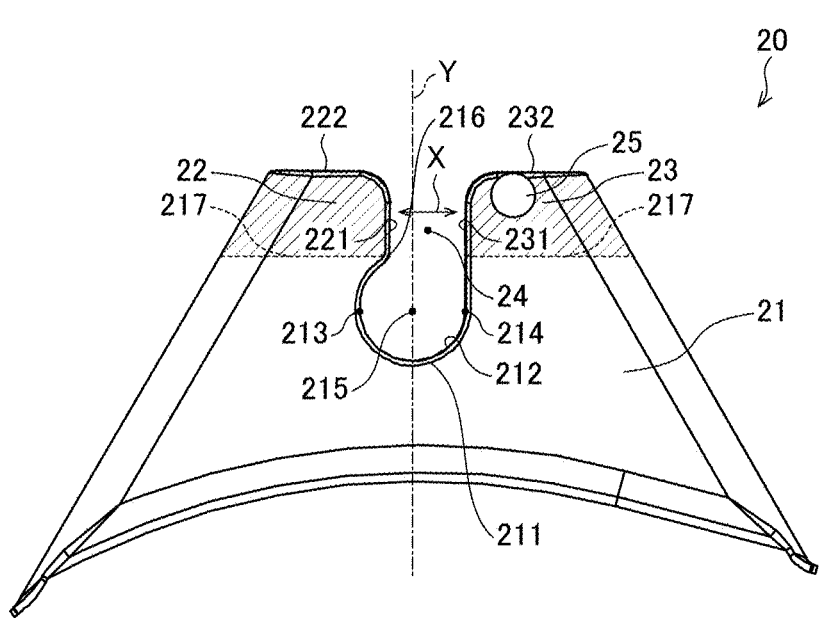
FIG. 3 is a side view of a clip pedestal of the door hole cover, viewed from a vehicle exterior side.
Figure 4:
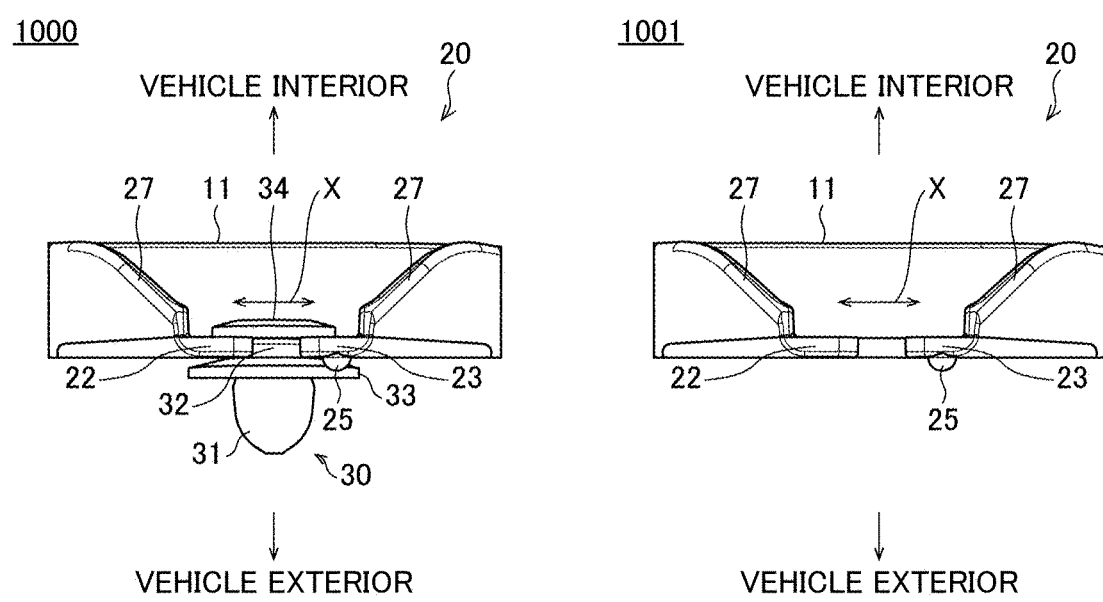
FIG. 4 shows the clip pedestal of the door hole cover, viewed from tip ends of guide walls.

The following will describe, with reference to FIGS. 3 and 4, a detailed structure of each of the clip pedestals 20 of the door hole cover 1. FIG. 3 is a side view of the clip pedestal 20 of the door hole cover 1, viewed from the vehicle exterior side. FIG. 4 shows the clip pedestal 20 of the door hole cover 1, viewed from tip ends 222 and 232 of guide walls 22 and 23. A reference sign 1000 in FIG. 4 shows a state where a corresponding one of the clips 30 is housed in the clip pedestal 20, and a reference sign 1001 in FIG. 4 shows a state where the clip 30 is not housed in the clip pedestal 20.

Note that, in FIG. 3, a front side and a back side of a drawing sheet respectively correspond to the vehicle exterior side and the vehicle interior side. In FIG. 4, an upper side and a lower side of a drawing sheet respectively correspond to the vehicle interior side and the vehicle exterior side. The description below will deal with only a single one of the plurality of clip pedestals 20, since all the clip pedestals 20 provided to the cover member 10 have the same configuration.

The clip pedestal 20 is a portion of the door hole cover 1, the portion having a structure for attaching the cover member 10 to the door inner panel D1. As shown in FIG. 3, the clip pedestal 20 includes a recessed portion 21 and a pair of guide walls 22 and 23. The recessed portion 21 is connected to the periphery 101 of the cover member 10. In the recessed portion 21, the clip 30 for attaching the door hole cover 1 to the door inner panel D1 is to be housed. The recessed portion 21 has a housing hole 211 which is a circularly recessed portion. Note that the housing hole 211 may alternatively have a quadrangular shape or a polygonal shape. Since the clip 30 is housed in the housing hole 211, the door hole cover 1 is attached to the door inner panel D1.

Here, the following will describe, with reference to FIG. 4, an example of a configuration of the clip 30. As indicated by the reference sign 1000 in FIG. 4, the clip 30 includes a head portion 31, a shaft portion 32, a first flange portion 33, and a second flange portion 34. The head portion 31 of the clip 30 is a portion that is to be fitted to a through-hole of the door inner panel D1. The shaft portion 32 of the clip 30 is connected to the head portion 31. In a state where the clip 30 is housed in the recessed portion 21, the shaft portion 32 is located inside the housing hole 211. An outer diameter of the shaft portion 32 is smaller than an outer diameter of the head portion 31.

A portion via which the head portion 31 and the shaft portion 32 are connected with each other has the first flange portion 33. The first flange portion 33 extends outward in a radial direction of the shaft portion 32. The first flange portion 33 comes into contact with a surface of the clip pedestal 20 which surface is on the vehicle exterior side, thereby restricting movement of the door hole cover 1 relative to the door inner panel D1 toward the vehicle exterior side. The second flange portion 34 is provided at an end portion of the shaft portion 32 which end portion is located on the vehicle interior side, and extends outward in the radial direction of the shaft portion 32. The second flange portion 34 comes into contact with a surface of the clip pedestal 20 which surface is on the vehicle interior side, thereby restricting movement of the door hole cover 1 relative to the door inner panel D1 toward the vehicle interior side. Each of an outer diameter of the first flange portion 33 and an outer diameter of the second flange portion 34 is larger than an outer diameter of the housing hole 211.

Returning back to FIG. 3, the guide wall 22 (first guide wall) and the guide wall 23 (second guide wall) of the clip pedestal 20 are provided so as to face each other. In FIG. 3, areas corresponding to the guide wall 22 and the guide wall 23 are indicated by slanted lines. An inner surface 221 of the guide wall 22 and an inner surface 231 of the guide wall 23 face each other. The guide wall 22 and the guide wall 23 are connected to an end portion 217 of the recessed portion 21, the end portion 217 having an opening 216 of the recessed portion 21. In FIG. 3, the end portion 217 of the recessed portion 21 is indicated by a broken line. To be more specific, the guide wall 22 and the guide wall 23 are connected to the end portion 217 of the recessed portion 21 such that the opening 216 is located between the guide wall 22 and the guide wall 23 in a facing direction X along which the inner surface 221 of the guide wall 22 and the inner surface 231 of the guide wall 23 face each other.

The inner surface 221 of the guide wall 22 and the inner surface 231 of the guide wall 23 are connected to an inner surface 212 of the recessed portion 21. The inner surface 212 is an inner surface of the recessed portion 21, and is also a surface constituting the housing hole 211. Note that the opening 216 is an opening for causing the clip 30 to be housed in the housing hole 211, and is constituted by a first end portion of the housing hole 211 and a second end portion of the housing hole 211. The first end portion of the housing hole 211 is connected to the inner surface 221 of the guide wall 22, and the second end portion of the housing hole 211 is connected to the inner surface 231 of the inner surface 231 of the guide wall 23.

The guide wall 22 and the guide wall 23 guide the clip 30 to the inside of the recessed portion 21. To be more specific, the shaft portion 32 of the clip 30 inserted from the tip end 222 of the guide wall 22 and the tip end 232 of the guide wall 23 is caused to move along the inner surface 221 of the guide wall and/or the inner surface 231 of the guide wall 23. Consequently, the clip 30 is guided into the housing hole 211 of the recessed portion 21. That is, the clip 30 is guided to the inside of the recessed portion 21 via the opening 216 by the inner surface 221 and/or the inner surface 231.

The guide wall 22 protrudes, more than the guide wall 23, in a direction for narrowing a space 24 created between the pair of guide walls 22 and 23. That is, when viewed in a direction from the vehicle interior side to the vehicle exterior side, the inner surface 221 is located so as to be closer to a center position 215 than the inner surface 231 is, as viewed in the facing direction X. The center position 215 is a center of an outer diameter of the housing hole 211, as viewed in the facing direction X. To be more specific, assuming that an imaginary line Y is an imaginary line which passes through the center position 215 of the housing hole 211 and which is orthogonal to the facing direction X, the inner surface 221 is located so as to be closer to the imaginary line Y than the inner surface 231 is, as viewed in the facing direction X. Further, the inner surface 221 is located so as to be closer to the center position 215 than an end portion 213 of the housing hole 211 is, as viewed in the facing direction X. The end portion 213 is one of two opposite end portions of the outer diameter of the housing hole 211 in the facing direction X, and is located on the guide wall 22 side. An end portion 214, which is the other of the two opposite end portions of the outer diameter of the housing hole 211 in the facing direction X, is located on the guide wall 23 side. Note that the guide wall 22 may at least partially protrude in the direction for narrowing the space 24.

The space 24 is a space created between the inner surface 221 of the guide wall 22 and the inner surface 231 of the guide wall 23. The space 24 is a space through which the shaft portion 32 of the clip 30 passes during a process of carrying out attachment or detachment of the door hole cover 1 with respect to the door inner panel D1. The configuration in which the guide wall 22 protrudes in the direction for narrowing the space 24 allows the clip 30 to come into contact with the protruding portion of the guide wall 22, so that the clip 30 housed in the housing hole 211 is restricted from moving toward the space 24. To be more specific, the above configuration allows the portion of the guide wall 22 which portion protrudes in the direction for narrowing the space 24 and the shaft portion 32 of the clip 30 to come into contact with each other, so that the clip 30 is restricted from moving toward the space 24. That is, the guide wall 22 prevents the clip 30 from falling off from the recessed portion 21.

The inner surface 231 of the guide wall 23 may be flush with a portion of the inner surface 212 which portion is connected to the guide wall 23. That is, there is no step in a portion via which the guide wall 23 and the housing hole 211 are connected with each other. The inner surface 231 of the guide wall 23 and the inner surface 212 of the recessed portion 21 are flush with each other. Thanks to this, in the course of housing the clip 30 in the recessed portion 21, the guide wall 23 hardly becomes an obstacle to movement of the clip 30 in a housing direction. Consequently, by moving the clip 30 along the guide wall 23, the clip 30 can easily be housed in the recessed portion 21.

In the expression "the inner surface 231 of the guide wall 23 and the inner surface 212 of the recessed portion 21 are flush with each other", the word "flush" does not mean complete flush. The "flush" herein encompasses, for example, (i) a case where the portion via which the inner surface 231 and the inner surface 212 are connected with each other have a quite small step inevitably generated during the process of forming the clip pedestal 20 and (ii) a case where at least one of the inner surface 231 and the inner surface 212 has fine unevenness inevitably generated during the process of forming the clip pedestal 20.

Note that the above-discussed aspect in which the guide wall 23 is provided is merely one example. The present invention is not limited to the configuration in which the inner surface 231 of the guide wall 23 and the inner surface 212 of the recessed portion 21 are flush with each other. For example, at least part of the guide wall 23 may protrude in the direction for narrowing the space 24. That is, when viewed in the direction from the vehicle interior side to the vehicle exterior side, the inner surface 231 may be located closer to the center position 215 than the end portion 214 of the housing hole 211 is, as viewed in the facing direction X. Also in this case, the guide wall 22 protrudes, more than the guide wall 23, in the direction for narrowing the space 24. That is, when viewed in the direction from the vehicle interior side to the vehicle exterior side, the inner surface 221 is located so as to be closer to the center position 215 than the inner surface 231 is, as viewed in the facing direction X.

As shown in FIGS. 3 and 4, a surface of the guide wall 23 which surface is on the vehicle exterior side has a protruded portion 25 protruding toward the vehicle exterior side. As shown in FIG. 3, the protruded portion 25 is preferably provided in the vicinity of the tip end 232 of the guide wall 23. As indicated by the reference sign 1000 in FIG. 4, the protruded portion 25 can be brought into contact with the first flange portion 33 of the clip 30. When the protruded portion 25 and the first flange portion 33 of the clip 30 come into contact with each other, the clip 30 housed in the recessed portion 21 is restricted from moving through the space 24 toward an outside of the space 24. That is, the protruded portion 25 of the guide wall 23 prevents the clip 30 from falling off from the recessed portion 21.

As shown in FIG. 4, a surface of the clip pedestal 20 which surface is on the vehicle interior side may have pedestal ribs 27 for reinforcing the clip pedestal 20. The number of pedestal ribs 27 is two or more. The pedestal ribs 27 are connected to a periphery rib 11 provided in the periphery 101 of the cover member 10. The periphery rib 11 is a rib for reinforcing the cover member 10. The pedestal ribs 27, which extend from the periphery rib 11, are provided so as to extend from the recessed portion 21 to the tip ends 222 and 232 of the guide walls 22 and 23.

According to the above-discussed configuration of the clip pedestal 20 of the door hole cover 1, the protruded portion 25 is not provided in the guide wall 22 among the pair of the guide walls 22 and 23. Thus, a tool for detaching the door hole cover 1 from the door inner panel D1 can be used such that the tool is applied from the guide wall 22 side in which no protruded portion 25 is provided. This makes it possible to carry out a work of detaching the door hole cover 1 from the door inner panel D1, while avoiding interference between the protruded portion 25 and the tool. Consequently, it is possible to improve the work efficiency of the detachment work of detaching the door hole cover 1 from the door inner panel D1. For example, the detachment work of the door hole cover 1 is carried out in a work such as (i) repair or inspection of a window regulator in the front door D or (ii) repair or inspection of a wire harness (which can also be called a cable) connected to a speaker and/or the like.

Further, with the configuration in which the protruded portion 25 is provided in the guide wall 23, it is possible to restrict the clip 30 from moving toward the outside of the recessed portion 21 by (i) contact between the clip 30 and at least part of the guide wall 22 which part protrudes in the direction for narrowing the space 24, created between the pair of the guide walls 22 and 23, and (ii) contact between the clip 30 and the protruded portion 25 provided in the guide wall 23. Consequently, it is possible to more reliably prevent the clip 30 from falling off from the recessed portion 21.

Furthermore, the protruded portion 25 is provided on the surface of the guide wall 23 which surface is on the vehicle exterior side. Thus, it is possible to provide a reinforcement part (e.g., the pedestal ribs 27 for reinforcing the guide wall 23 of the clip pedestal 20) on the surface of the guide wall 23 which surface is on the vehicle interior side. This provides freedom in a shape of a portion of the guide wall 23 which portion is on the vehicle interior side.

Note that the above-discussed aspect in which the guide wall 22 and the guide wall 23 are provided is merely one example. For example, at least one of the tip end 222 of the guide wall 22 and the tip end 232 of the guide wall 23 may have an inclined surface for facilitating insertion of the clip 30 into the space 24. To be more specific, the inclined surface provided on at least one of the tip ends 222 and 232 is inclined in such a direction that the inclined surface makes the space 24 narrower as its increasing proximity toward the recessed portion 21 from the tip end 222 and/or the tip end 232. That is, the guide wall 22 and the guide wall 23 may be configured so as to increase a distance between the tip ends 222 and 232 in the facing direction X.

Moreover, the above-discussed aspect in which the protruded portion 25 is formed is merely one example. The protruded portion 25 is not limited to the configuration, as indicated in the present embodiment, in which the protruded portion 25 is provided on the surface of the guide wall 23 which surface is on the vehicle exterior side. Alternatively, for example, the protruded portion 25 may protrude, from the surface of the guide wall 23 which surface is on the vehicle interior side, toward the vehicle interior side. In this case, the protruded portion 25 restricts movement of the clip 30 by contact between the protruded portion 25 and the second flange portion 34 of the clip 30. Further alternatively, the protruded portion 25 may not be provided in the guide wall 23, and may be provided so as to protrude, from a surface of the guide wall 22 which surface is on the vehicle interior side or the vehicle exterior side, in the direction to the vehicle interior side or the vehicle exterior side.

Aspects of the present invention can also be expressed as follows:

A door hole cover in accordance with a first aspect of the present invention is a door hole cover which is to be attached to a door inner panel of a door of a vehicle, the door hole cover including: a cover member configured to cover, from a vehicle interior side, a door hole provided in the door inner panel; a plurality of recessed portions provided in a periphery of the cover member, each of the plurality of recessed portions being configured to allow a clip to be housed therein, the clip being used to attach the door hole cover to the door inner panel; a pair of guide walls connected to an end portion of a corresponding one of the plurality of recessed portions which end portion has an opening, the pair of the guide walls facing each other, the pair of the guide walls being configured to guide the clip to an inside of the corresponding one of the plurality of recessed portions; and a protruded portion protruding from one of the pair of the guide walls, the pair of the guide walls creating a space therebetween, the pair of the guide walls being constituted by a first guide wall and a second guide wall, at least part of the first guide wall protruding, more than the second guide wall, in a direction for narrowing the space, the at least part of the first guide wall coming into contact with the clip so that the clip housed in the corresponding one of the plurality of recessed portions is restricted from moving toward the space, and the protruded portion coming into contact with the clip so that the clip housed in the corresponding one of the plurality of recessed portions is restricted from moving through the space toward an outside of the space.

According to the door hole cover in accordance with the first aspect, the protruded portion is not provided in one of the pair of the guide walls. Thus, a tool for detaching the door hole cover from the door inner panel can be used such that the tool is applied from the guide wall side in which no protruded portion is provided. This makes it possible to carry out a work of detaching the door hole cover from the door inner panel, while avoiding interference between the protruded portion provided in the guide wall and the tool. Consequently, it is possible to improve the work efficiency of the detachment work of detaching the door hole cover from the door inner panel.

A door hole cover in accordance with a second aspect of the present invention is configured such that, in the first aspect, an inner surface of the second guide wall is flush with a portion of an inner surface of the corresponding one of the plurality of recessed portions, the portion being connected to the second guide wall.

According to the door hole cover in accordance with the second aspect, the inner surface of the second guide wall and the inner surface of the recessed portion are flush with each other. Thus, in the course of housing the clip in the recessed portion, movement of the clip in a housing direction is hardly hindered on the second guide wall side. Consequently, by moving the clip along the second guide wall, the clip can easily be housed in the recessed portion.

A door hole cover in accordance with a third aspect of the present invention is configured such that, in the first or second aspect, the protruded portion is provided in the second guide wall.

According to the door hole cover in accordance with the third aspect, it is possible to restrict the clip from moving toward the outside of the recessed portion by (i) contact between the clip and at least part of the first guide wall which part protrudes in the direction for narrowing the space, created between the pair of the guide walls, and (ii) contact between the clip and the protruded portion provided in the second guide wall. Consequently, it is possible to more reliably prevent the clip from falling off from the recessed portion.

A door hole cover in accordance with a fourth aspect of the present invention is configured such that, in the third aspect, the protruded portion protrudes from a surface of the second guide wall which surface is on a vehicle exterior side.

According to the door hole cover in accordance with the fourth aspect, the protruded portion is provided on the surface of the second guide wall which surface is on the vehicle exterior side. Therefore, it is possible to provide, on a surface of the second guide wall which surface is on the vehicle interior side, a reinforcement part (e.g., a rib) for reinforcing the guide wall, for example. This provides freedom in a shape of a portion of the second guide wall which portion is on the vehicle interior side.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: door hole cover
10: cover member
20: clip pedestal
21: recessed portion
22: guide wall (first guide wall)
23: guide wall (second guide wall)

24: space
25: protruded portion
30: clip
101: periphery
216: opening
217: end portion
D1: door inner panel
D2: door hole

The invention claimed is:

1. A door hole cover which is to be attached to a door inner panel of a door of a vehicle, the door hole cover comprising:
   a cover member configured to cover, from a vehicle interior side, a door hole provided in the door inner panel;
   a plurality of recessed portions provided in a periphery of the cover member, each of the plurality of recessed portions being configured to allow a clip to be housed therein, the clip being used to attach the door hole cover to the door inner panel;
   a pair of guide walls connected to an end portion of a corresponding one of the plurality of recessed portions which end portion has an opening, the pair of the guide walls facing each other, the pair of the guide walls being configured to guide the clip to an inside of the corresponding one of the plurality of recessed portions; and
   a protruded portion protruding from one of the pair of the guide walls,
   the pair of the guide walls creating a space therebetween, the pair of the guide walls being constituted by a first guide wall and a second guide wall, at least part of the first guide wall protruding, more than the second guide wall, in a direction for narrowing the space,
   the at least part of the first guide wall coming into contact with the clip so that the clip housed in the corresponding one of the plurality of recessed portions is restricted from moving toward the space, and
   the protruded portion coming into contact with the clip so that the clip housed in the corresponding one of the plurality of recessed portions is restricted from moving through the space toward an outside of the space.

2. The door hole cover according to claim 1, wherein:
   an inner surface of the second guide wall is flush with a portion of an inner surface of the corresponding one of the plurality of recessed portions, the portion being connected to the second guide wall.

3. The door hole cover according to claim 1, wherein:
   the protruded portion is provided in the second guide wall.

4. The door hole cover according to claim 3, wherein:
   the protruded portion protrudes from a surface of the second guide wall which surface is on a vehicle exterior side.

* * * * *